(12) United States Patent
Schwärzler

(10) Patent No.: US 7,025,683 B2
(45) Date of Patent: Apr. 11, 2006

(54) CONSTANT VELOCITY BALL JOINT WITH BALL PAIRS WHOSE TRACKS ARE LOCATED ON SYMMETRICAL PLANES

(75) Inventor: Peter Schwärzler, Glattbach (DE)

(73) Assignee: GKN Lobro GmbH, (DE)

( * ) Notice: Subject to any disclaimer, the term of this patent is extended or adjusted under 35 U.S.C. 154(b) by 0 days.

(21) Appl. No.: 10/332,292

(22) PCT Filed: May 25, 2001

(86) PCT No.: PCT/EP01/05985

§ 371 (c)(1),
(2), (4) Date: Sep. 8, 2003

(87) PCT Pub. No.: WO02/08624

PCT Pub. Date: Jan. 31, 2002

(65) Prior Publication Data

US 2004/0254021 A1    Dec. 16, 2004

(30) Foreign Application Priority Data

Jul. 10, 2000    (DE) ............................... 100 33 491

(51) Int. Cl.
F16D 3/224    (2006.01)
(52) U.S. Cl. ........................................ 464/145; 464/906
(58) Field of Classification Search ................. 464/140, 464/145, 146, 906
See application file for complete search history.

(56) References Cited

U.S. PATENT DOCUMENTS

| | | | |
|---|---|---|---|
| 4,020,650 A | * | 5/1977 | Krude ........................ 464/146 |
| 4,078,400 A | | 3/1978 | Krude |
| 5,685,777 A | | 11/1997 | Schwärzler |
| 6,071,195 A | * | 6/2000 | Krude .................... 464/145 X |

FOREIGN PATENT DOCUMENTS

| | | |
|---|---|---|
| DE | 24 61 298 | 11/1975 |
| DE | 25 18 956 | 3/1976 |
| DE | 44 40 285 C1 | 4/1996 |
| DE | 195 45 086 A1 | 6/1996 |
| DE | 197 04 761 A1 | 8/1998 |
| EP | 0 950 824 A2 | 10/1999 |
| JP | 11303882 | 11/1999 |

* cited by examiner

Primary Examiner—Greg Binda

(57) ABSTRACT

A constant velocity fixed ball joint provided with an outer joint with outer tracks and an inner joint part with inner tracks. The outer tracks and inner tracks form sets of tracks, with a torque transmitting ball being guided in each set of tracks. A ball cage accommodates the balls in circumferentially distributed cage windows and, when the joint is articulated, guides the balls on to the angle-bisecting plane between the longitudinal axes. The cage windows each accommodate pairs of balls. When the joint is in the aligned condition, in the central joint plane, the angular distance of the balls within the individual pairs of balls is smaller than the angular distance between balls associated with pairs adjoining one another; and the center lines of the sets of tracks of the pairs of balls extend in planes which extend parallel relative to one another.

6 Claims, 6 Drawing Sheets

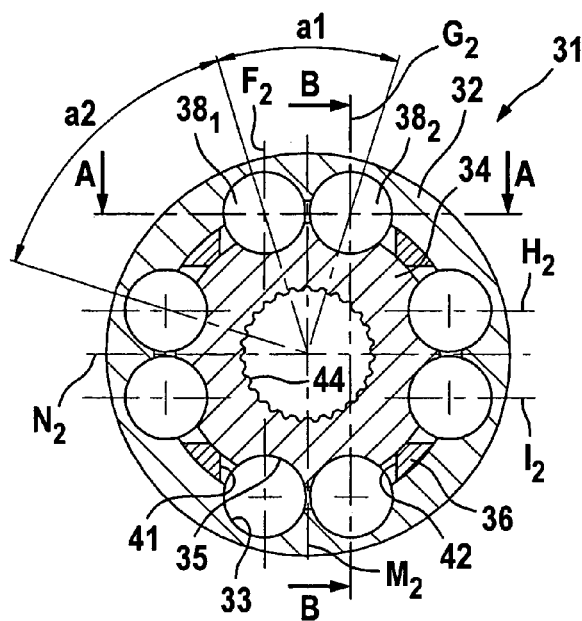
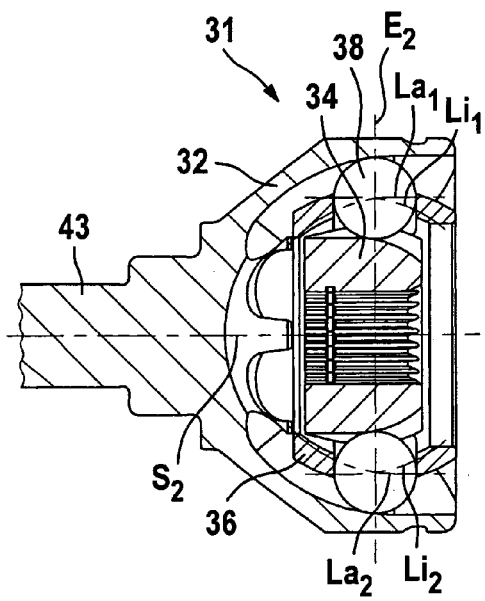
Fig. 2A
Fig. 2C
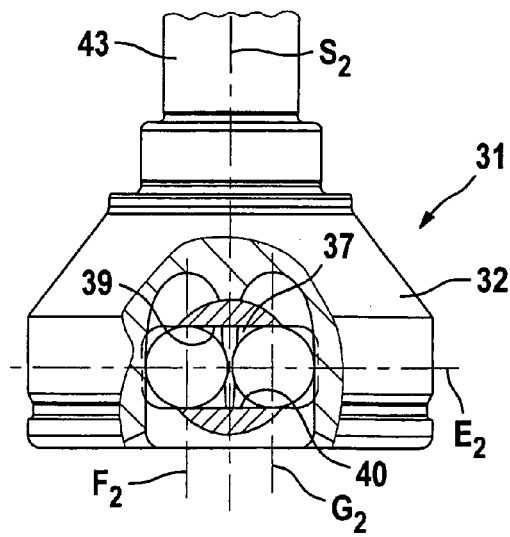
Fig. 2B

CONSTANT VELOCITY BALL JOINT WITH BALL PAIRS WHOSE TRACKS ARE LOCATED ON SYMMETRICAL PLANES

Background Of The Invention

The invention relates to a constant velocity fixed ball joint provided with an outer joint part having a first longitudinal axis and an inner chamber with outer tracks extending in said inner chamber in the longitudinal direction; provided with an inner joint part having a second longitudinal axis and forming a hub member with inner tracks extending on said hub member in the longitudinal direction; the outer tracks and inner tracks form sets of tracks, with a torque transmitting ball being guided in each set of tracks; the outer tracks and inner tracks each comprise curved center lines, with the center lines of the individual sets of tracks of an aligned joint intersecting one another in the central joint plane positioned normally relative to the longitudinal axes; a ball cage accommodates the balls in circumferentially distributed cage windows and, when the joint is articulated, guides the balls on to the angle-bisecting plane between the longitudinal axes.

Such joints can be so-called Rzeppa joints wherein the center lines of sets of tracks are normally formed by circular arches whose centers are offset on the longitudinal axes relative to the central joint plane. However, such joints can also be undercut-free (UF) joints wherein the center lines of the sets of tracks, with reference to the longitudinal axes, rise monotonely or fall monotonely, as a result of which there are formed axially undercut-free tracks. Joints of this type can also be provided in the form of counter track joints wherein some of the sets of tracks open in a first axial direction and some of the sets of tracks open in the opposite axial direction. This means that the center lines of the outer tracks in the outer joint part and the center lines of the inner tracks in the inner joint part each form two groups whose curvatures differ in the longitudinal direction with reference to the longitudinal axis.

Joints of this type are assembled by being over-articulated in that there is set an articulation angle which is greater than the angles of the operating range, so that the cage windows leave the outer joint part enabling the balls to be radially inserted into the cage windows. To permit this type of assembly, the cage windows have to be longer in the circumferential direction than required for articulating the joint within the operating range. In consequence, the width of the webs between the cage windows is reduced and the cage is weakened.

From DE 24 61 298 B1 and from DE 197 04 761 A1 it is known to provide plunging joints with ball track assemblies which allow pairs of balls to be accommodated in the individual cage windows of the ball cage.

SUMMARY OF THE INVENTION

It is the object of the present invention to provide a compact fixed joint for being accommodated in a predetermined space and having a greatest possible torque transmitting capacity and a high efficiency. In particular, it should be possible to produce said constant velocity fixed joint economically.

The first solution provides a joint with the following characteristics: the cage windows each accommodate pairs of balls, when the joint is in the aligned condition, in the central joint plane, the angular distance cd between the center lines of the sets of tracks and, respectively, between the balls within the individual pairs of balls is smaller than the angular distance $\alpha 2$ between the center lines of sets of balls and, respectively, balls associated with pairs adjoining one another; the center lines of the sets of tracks of the pairs of balls extend in planes which extend parallel relative to one another.

A second solution provides a joint with the following characteristics:
the cage windows each accommodate pairs of balls,
when the joint is in the aligned condition, in the central joint plane, the angular distance $\alpha 1$ between the center lines of the sets of tracks and, respectively between the balls within the individual pairs of balls is smaller than the angular distance $\alpha 2$ between the center lines of sets of balls and, respectively, balls associated with pairs adjoining one another;
the center lines of the sets of tracks of the pairs of balls extend in planes which intersect one another outside the joint in lines extending parallel relative to the longitudinal axes.

A third solution provides a joint with the following characteristics:
the cage windows each accommodate pairs of balls,
when the joint is in the aligned condition, in the central joint plane, the angular distance $\alpha 1$ between the center lines of the sets of tracks and, respectively, between the balls within the individual pairs of balls is smaller than the angular distance $\alpha 2$ between the center lines of the sets of tracks and, respectively, balls associated with pairs adjoining one another;
the center lines of the sets of tracks of the pairs of balls extend symmetrically relative to a plane through the longitudinal axes and are positioned at the shortest distance from one another in the central joint plane.

With a preferred minimum number of four pairs of balls, as compared to prior art joints with six balls and eight balls, it is now possible—with a predetermined joint size—to increase the torque transmitting capacity and to improve the joint efficiency.

A joint of said characteristics has substantial advantages in that, due to the number of cage windows being halved, the webs between the cage windows can be substantially widened.

In particular, this is assisted by the unequal angular distances $\alpha_1$, $\alpha_2$ provided between the centre lines of the sets of tracks of the pairs of balls on the one hand and the centre lines of the sets of tracks of the balls of adjoining pairs on the other hand.

In addition, said unequal pitch angles of the tracks across the circumference succeed in suppressing vibration excitations to which joints with equal pitch angles tend to be subjected. Provided the two different angular distances comprise a ratio of $\alpha_2/\alpha_1$ ranging between 1.2 and 1.8, in particular approximately 1.5, this will have the effect of suppressing such vibration excitations, because the excitation phase of each two balls of a pair positioned closer to one another is displaced by 180° relative to the excitation phase of two balls of adjoining pairs positioned further away from one another.

In accordance with the initially mentioned field of the invention, said embodiments can be used in joints wherein the center lines of the first tracks and of the second tracks change their distance from the longitudinal axis of the respective component in their longitudinal extension correspondingly (UF, Rzeppa) or wherein the center lines of the first tracks and of the second tracks of the sets of tracks of the pairs of balls change their distance from the longitudinal axis of the respective component in their longitudinal extension in opposite sense, i.e. so-called counter track joints.

If one looks at the details of the sets of tracks of pairs of balls, one can see in respect of the type of joint mentioned first (Rzeppa, UF) that the center lines of the two outer tracks (in the outer joint part) of each pair of tracks extend symmetrically relative to one another and that the center lines of the two inner tracks (in the inner joint part) of each pair of tracks extend symmetrically relative to one another. On the other hand, as far as the type of joint mentioned in second place (counter track joint) is concerned, it can be seen that the center line of the outer track (in the outer joint part) of the one set of tracks of a pair of tracks extends symmetrically relative to the center line of the inner track (in the inner joint part) of the other set of tracks of the pair of tracks and that the center line of the inner track (in the inner joint part) of the one set of tracks of said pair of tracks extends symmetrically relative to the center line of the outer track (in the outer joint part) of the other set of tracks of the pair of tracks.

The purpose of suitably varying the distance between the center lines of the sets of tracks of pairs of balls, which variation deviates from the equi-distant design of the center lines, is to ensure that the hub webs at the inner part and the webs in the outer part between the sets of tracks of pairs of balls do not become too narrow towards their ends and that the cage window length required for assembly purposes in the circumferential direction is minimized.

According to a further advantageous embodiment of a joint of said type, it is proposed that the cage windows comprise circumferentially extending ball contact guiding flanks which extend parallel relative to one another and that the cage windows comprise the ball contact guiding flanks connecting ball contact end edges which extend substantially radially relative to the longitudinal axis of the ball cage. This measure makes it possible to provide the balls in a highly articulated joint with the necessary freedom of movement within the cage windows while additionally achieving an increase in strength. The cage windows can initially be stamped out with a shorter circumferential length than will eventually be required, with external chamfers at the ball contact end edges of the cage windows being removed.

BRIEF DESCRIPTION OF THE DRAWINGS

Preferred embodiments of the invention will be explained with reference to the drawings wherein:

FIG. 1 shows a joint according to the state of the art
A) in a cross-section through the central joint plane,
B) in the section C—C according to FIG. 1a.

FIG. 4 shows an inventive joint in a third embodiment with a modified cage window
A) in a cross-section through the central joint plane,
B) in a section A—A according to FIG. 4a
C) in a section B—B according to FIG. 4a.

DETAILED DESCRIPTION OF THE INVENTION

Figure 1A:
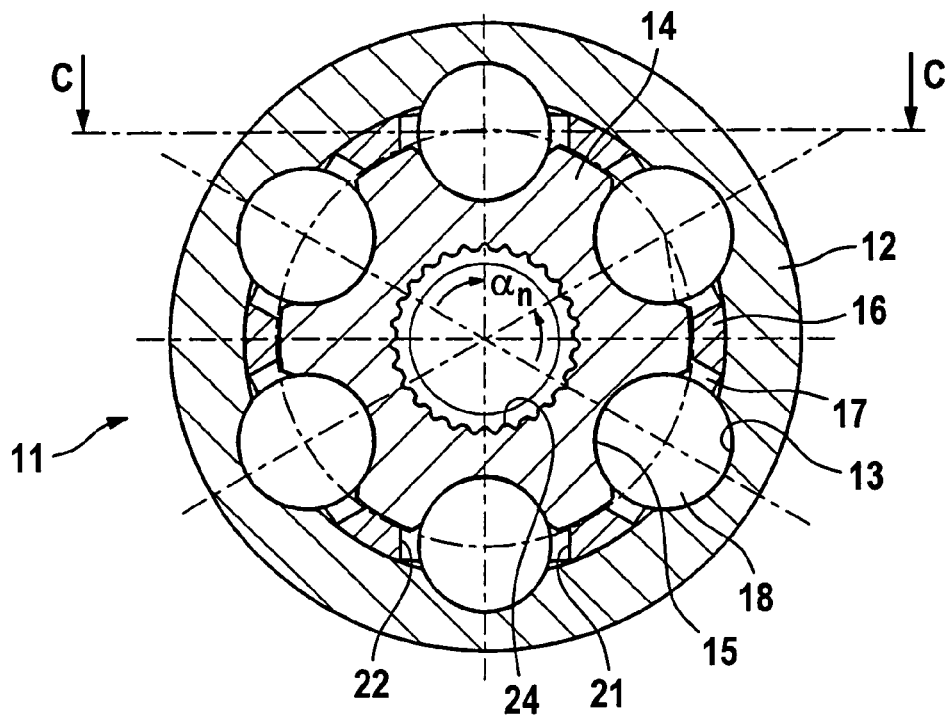
Figure 1B:
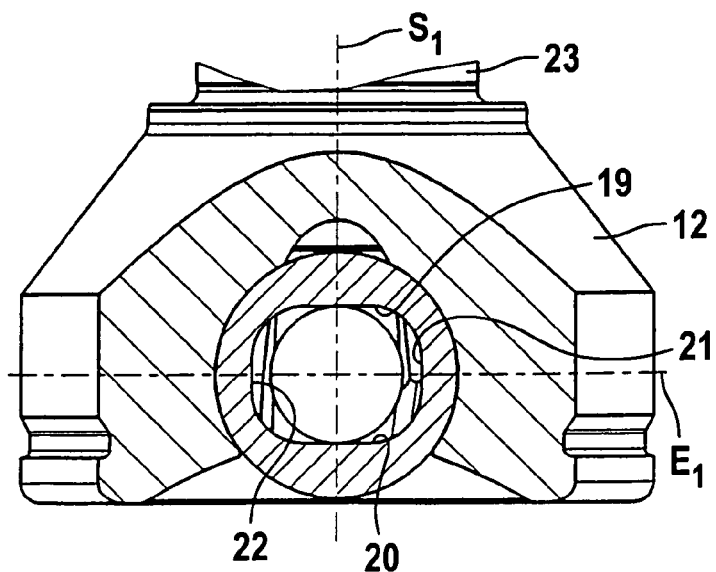

FIG. 1 shows a constant velocity fixed joint 11 according to the state of the art in the form of a joint with six balls, comprising an outer joint part 12 with outer ball tracks 13, an inner joint part 14 with inner ball tracks 15, a ball cage 16 with cage windows 17 and balls 18 received in the latter. The cage windows comprise circumferentially extending parallel ball contact guiding flanks 19, 20 as well as ball contact end flanks 21, 22 connecting the latter. The respective pairs of flanks 19, 20; 21, 22 are arranged parallel relative to one another. Outer ball tracks 13 and inner ball tracks 15 which are associated with one another form sets of tracks in the sense as used in this Application. The angular distance between the individual pairs of tracks amounts to $\alpha_n$ in all cases. The centers of the balls 18 are positioned in the central ball plane $E_1$. The longitudinal axes have jointly been given the reference symbol $S_1$.

At the outer joint part 12, there is formed on a journal 13 for introducing torque. In the inner joint part 14, there is provided a longitudinal bore 24 for introducing a shaft end for transmitting the torque.

Figure 2D:
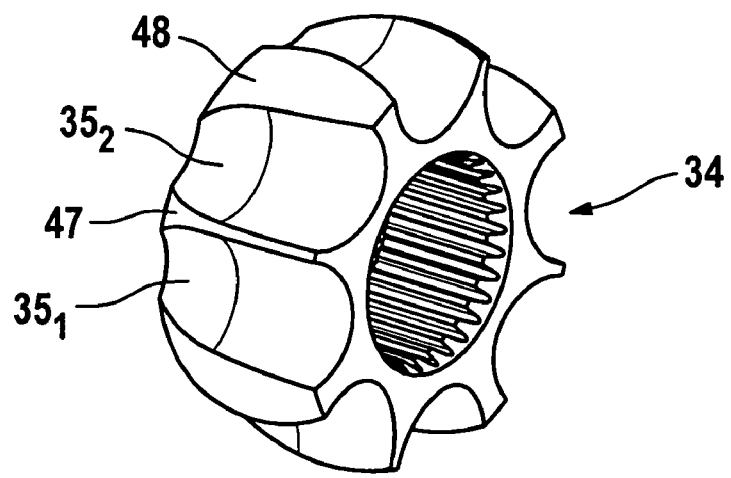
FIG. 2 shows an inventive joint in a first embodiment as a UF joint
A) in a cross-section through the central joint plane
B) in a section A—A according to FIG. 2a
C) in a section B—B according to FIG. 2a
D) showing the inner joint part on its own
E) showing the outer joint part on its own.
Figure 2E:
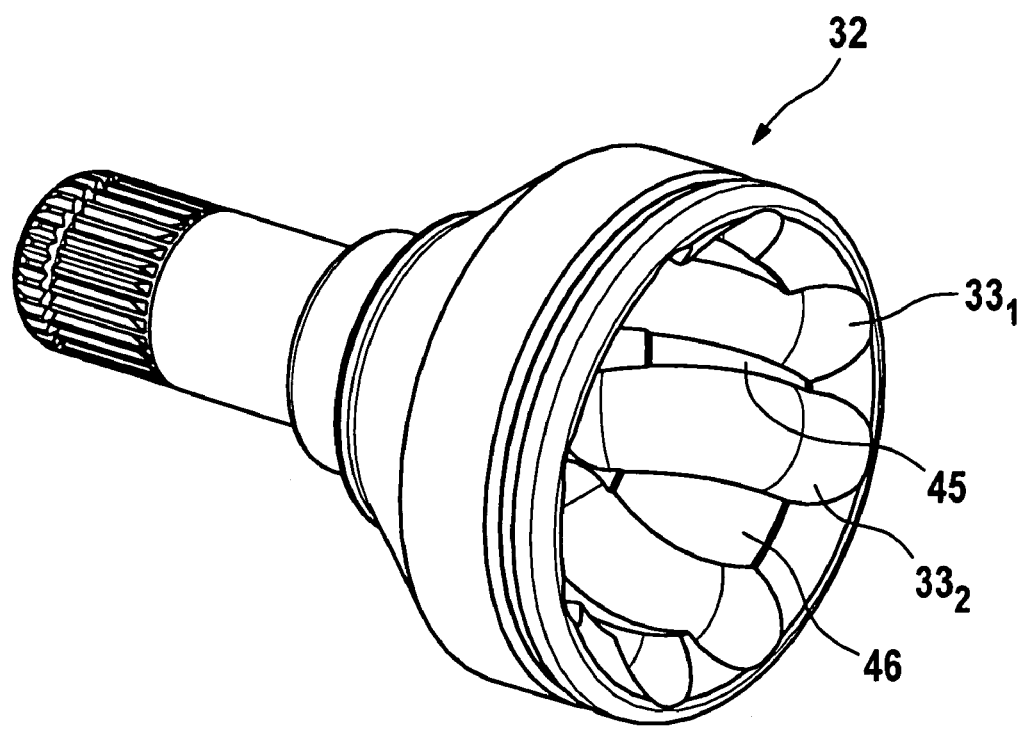

FIG. 2 shows a constant velocity fixed ball joint 31 in accordance with the invention with four pairs of balls; it comprises an outer joint part 32 with outer ball tracks 33, an inner joint part 34 with inner ball tracks 35, a ball cage 36 with four circumferentially distributed cage windows 37 as well as pairs of balls 38. The cage windows 37 comprise circumferentially distributed parallel ball contact guiding flanks 39, 40 as well as ball contact end flanks 41, 42 connecting the latter. Radially opposed outer ball tracks 33 and inner ball tracks 35 form sets of tracks in accordance with the use of said term in the present application. The ball cage 36 guides the balls 38 onto the angle-bisecting plane between the longitudinal axes $S_2$ when the joint is articulated.

When the joint is aligned, in the central plane $E_2$ of the joint as shown in FIG. 2A, the angular distance $\alpha 1$ between the sets of tracks of a pair of balls $38_1$, $38_2$ is smaller than the angular distance $\alpha 2$ between the sets of tracks of ball of adjoining pairs of balls. The ratio of the first angular distance $\alpha 1$ to the second angular distance $\alpha 2$ can range between 1.2 and 1.8. In the section through the central joint plane $E_2$ there are shown two pairs of planes $F_2$, $G_2$, $H_2$, $I_2$ which contain the centers of the respective balls and which, in pairs, extend parallel relative to one another. These planes and thus the center lines of the sets of tracks of pairs of balls extend in pairs symmetrically relative to radial planes $M_2$, $N_2$ through the longitudinal axes $S_2$ shown jointly. Thus, the center lines of the two outer tracks 33 of each pair of tracks extend symmetrically relative to one another, and the center lines of the two inner tracks 35 of each pair of tracks extend symmetrically relative to one another. In the section A—A in FIG. 2B the planes $F_2$, $G_2$ extending parallel relative to one another are also shown. As explained in section B—B offset from the center, as shown in FIG. 2C, said planes accommodate the center lines $La_1$, $Li_1$, $La_2$, $Li_2$ of outer ball tracks and inner ball tracks which intersect one another in the centers of the balls. That is, the outer and inner tracks each include curved center lines with the outer lines of the individual sets of tracks of an aligned joint intersecting one another in the distal joint plane $E_2$ which is positioned normal to the longitudinal axes $S_2$. Also, the center lines $La_1$, $La_2$ of the outer tracks 22 and the center lines $Li_1$, $Li_2$ of the inner tracks 35 change their distance from the longitudinal axis $S_2$ of the respective component, in their longitudinal extension, correspondingly. If viewed from the joint aperture end, said sets of tracks defined by said track center lines form undercut-free formations. The section through the plane $G_2$ shown in FIG. 2C is also characteristic of the planes $F_2$, $H_2$ and $I_2$. The center line of the sets of tracks of pairs of balls thus extends in parallel planes, in the same direction and in an equi-distant way.

FIG. D shows the inner joint part 34 with four pairs of inner ball tracks $35_1$, $35_2$ between which there is positioned a web 47, whereas between two inner ball tracks of adjoining pairs of tracks, there is positioned a web 48 of a second type with a greater width. It can be seen that the four pairs of inner ball tracks $35_1$, $35_2$ are identical to one another and that the inner ball tracks $35_1$, $35_2$ of one pair are mirror-symmetric relative to one another. From the right-hand side of the inner joint part facing the joint aperture, all inner ball tracks 35 are undercut-free.

In FIG. E, the outer joint part 32 is shown to comprise pairs of outer ball tracks $33_1$, $33_2$ which are separated by a web 45 with a smaller width, whereas between the outer ball tracks 33 of adjoining pairs of ball tracks, there can be seen a web 46 of a second type which is clearly wider. It can be seen clearly that the four pairs of outer ball tracks $33_1$, $33_2$ are identical to one another and that the two outer ball tracks $33_1$, $33_2$ of one pair of ball tracks extend symmetrically relative to the web 45. If viewed from the joint aperture end, all outer ball tracks 33 are undercut-free.

For torque introducing purposes, a journal 43 is formed on to the outer joint part 32. In the inner joint part 34 there is provided a longitudinal bore 44 for introducing a shaft end for the purpose of transmitting the torque.

FIG. 3 shows a constant velocity fixed ball joint in accordance with the invention with four pairs of balls; it comprises an outer joint part 52 with outer ball tracks 53, an inner joint part 54 with inner ball tracks 55, a ball cage 56 with four circumferentially distributed cage windows 57 as well as pairs of balls 58. The cage windows 57 comprise circumferentially extending, parallel ball contact guiding flanks 59, 60 as well as ball contact end flanks 61, 62 connecting the latter. Radially opposed outer ball tracks 53 and inner ball tracks 55 form sets of tracks in accordance with the use of said term in the present Application.

Figure 3A:
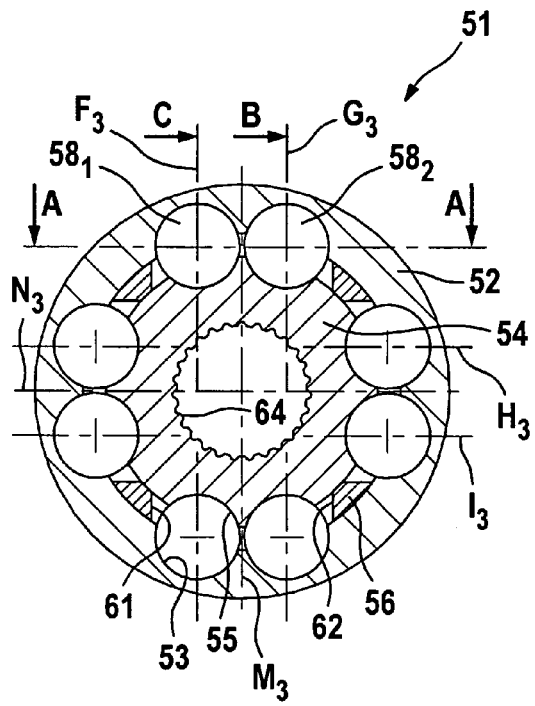
FIG. 3 shows an inventive joint in a second embodiment as a UFC joint
A) in a cross-section through the central joint plane
B) in a section A—A according to FIG. 3a
C) in a section B—B according to FIG. 3a
D) in a section C—C according to FIG. 3a
E) showing the inner joint part on its own
F) showing the outer joint part on its own.
Figure 3C:
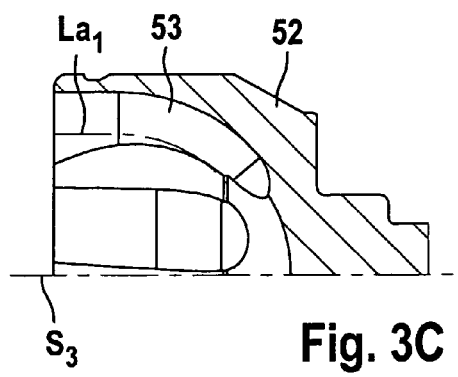
Figure 3B:
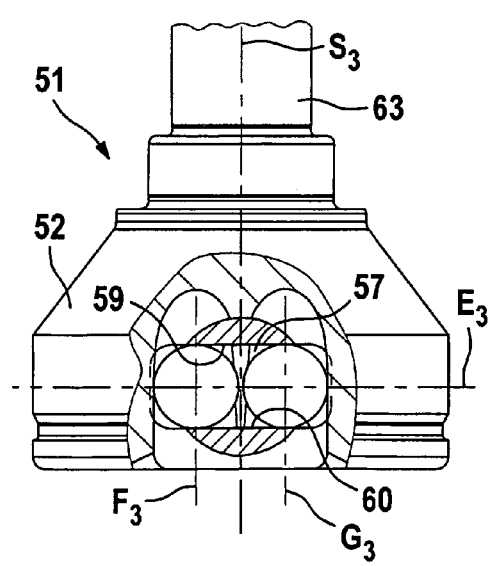
Figure 3D:
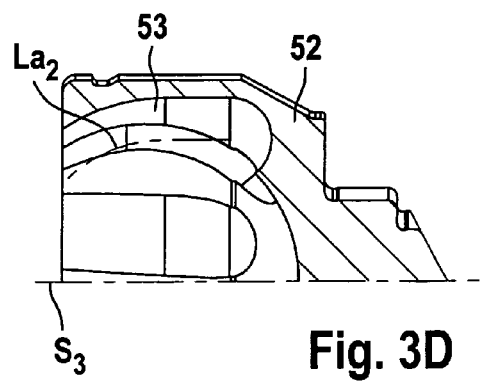

In the central plane $E_3$ of the joint shown in FIG. 3A, the angular distance $\alpha 1$ between the sets of tracks of a pair of balls is smaller than the angular distance $\alpha 2$ between the sets of tracks of the balls of adjoining pairs of balls. In the section through the central joint plane $E_2$, there are shown two pairs of planes $F_3$, $G_3$, $H_3$, $I_3$ in which there are positioned the centers of the balls and which, in pairs, extend parallel relative to one another. Said planes and thus the center lines of the sets of tracks of pairs of balls extend in pairs symmetrically relative to the radial planes $M_3$, $N_3$ through the longitudinal axes $S_3$ which are shown jointly. In the section A—A in FIG. 3B the planes $F_3$, $G_3$ extending parallel relative to one another are also shown. As explained in sections B—B and C—C offset from the center, as shown in FIGS. 3C and 3D, said planes accommodate the center lines $La_1$, $La_2$, of outer ball tracks of a pair of balls which are intersected by corresponding symmetrically extending center lines of inner ball tracks in the centers of the balls. If viewed from the joint aperture end, said sets of tracks defined by said track center lines form formations extending in opposite directions. The section through the plane $G_3$ shown in FIG. 3C is also characteristic of the plane $I_2$ and the section of plane $F_3$ shown in FIG. 3D is characteristic of the plane $H_3$. The center lines of the sets of tracks of pairs of balls thus extend in parallel planes, but in opposite directions and there exists symmetry between the center lines of an outer ball track and an inner ball track of the two sets of tracks.

Figure 3E:
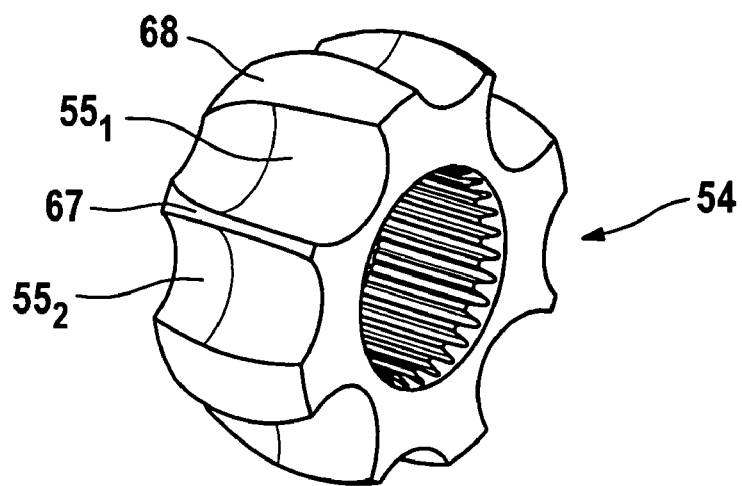

In FIG. 3E, the inner joint part 54 is shown to comprise four pairs of inner ball tracks $55_1$, $55_2$ between which there is provided a web 67, whereas between two inner ball tracks of adjoining pairs of tracks, there is provided a web 68 of a second type with a greater width. It can be seen that the four pairs of inner ball tracks $55_1$, $55_2$ are identical to one another and that the inner ball tracks $55_1$, $55_2$ of one pair extend in a deepened form in opposite directions relative to one another.

From the righthand side of the inner joint part facing the joint aperture, only the ball tracks $55_2$ are undercut-free and if viewed from the lefthand side facing the base, the ball tracks $55_1$ are undercut-free.

Figure 3F:
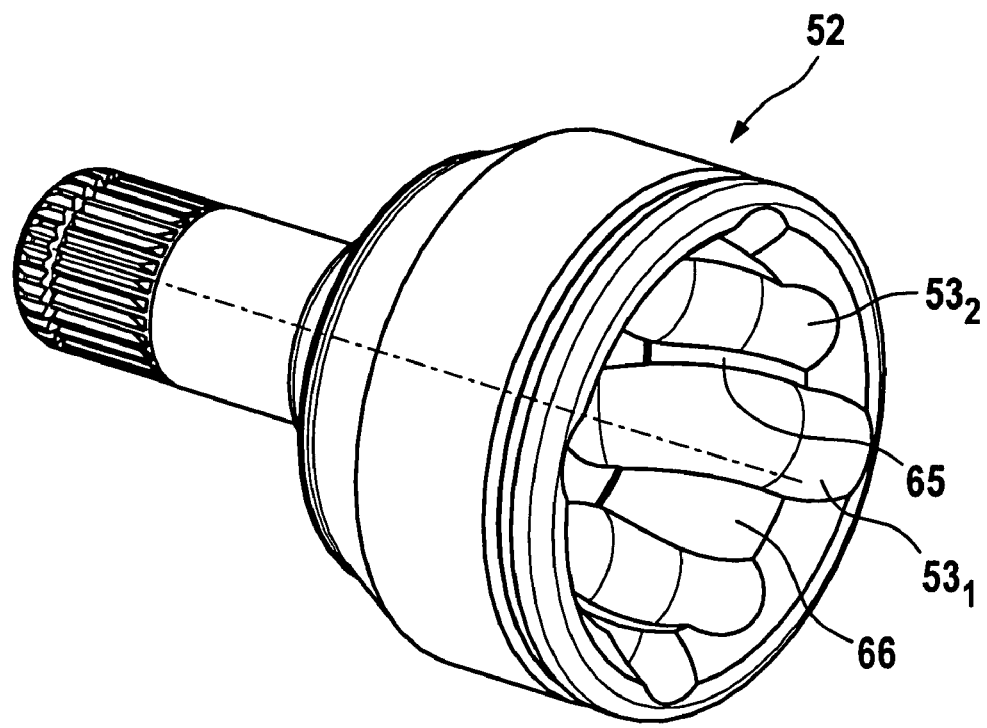

In FIG. 3F, the outer joint part 52 is shown to comprise outer ball tracks $53_1$, $53_2$ which are arranged in pairs and which are separated by the web 65 of a smaller width, whereas between the outer ball tracks 33 of adjoining pairs of ball tracks there can be seen a web 66 of a second type which clearly comprises a greater width. It can be seen that the four pairs of outer ball tracks $53_1$, $53_2$ are identical to one another and that the outer ball tracks $53_1$, $53_2$ of a pair of tracks extend in a deepened form in opposite directions. If viewed from the joint aperture end, the ball tracks $53_1$ are undercut-free and if viewed from the joint base, the ball tracks $53_2$ are undercut-free.

At the outer joint part 52 there is formed on a journal 63 for the purpose introducing torque. The inner joint part 54 is positioned in a longitudinal bore 64 for introducing a shaft end for the purpose of transmitting said torque.

Figure 4A:
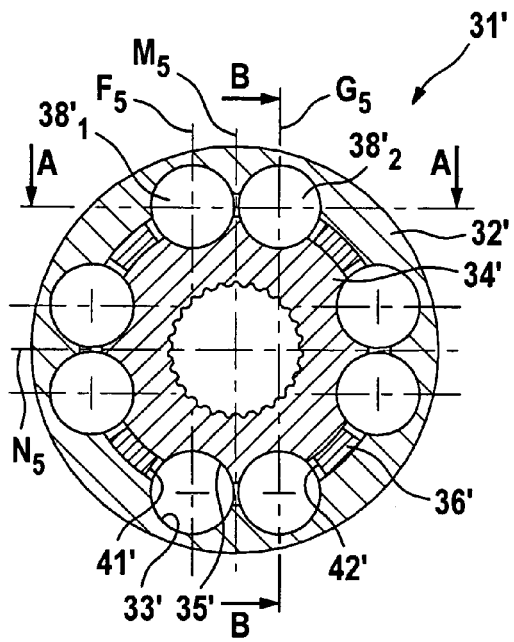
Figure 4C:
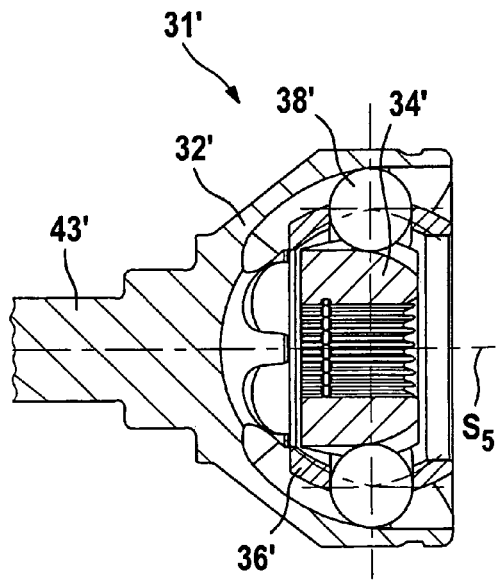
Figure 4B:
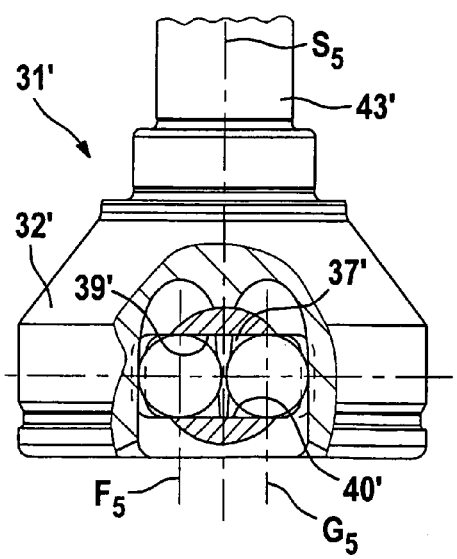

FIG. 4 shows a constant velocity fixed ball joint 31 in accordance with the invention which is provided with four pairs of balls and substantially corresponds to the joint shown in FIG. 2. However, it deviates from the joint shown in FIG. 2 in that the ball contact end flanks 41', 42' extend radially relative to the longitudinal axes of the joint. Otherwise all details are the same. To that extent, reference is made to the description of FIG. 2.

The invention claimed is:

1. A constant velocity fixed ball joint (31, 51, 71) comprising:
   an outer joint part (32, 52, 72) having a first longitudinal axis and outer tracks (33, 53, 73) extending in the longitudinal direction;
   an inner joint part (34, 54, 74) having a second longitudinal axis and inner tracks (35, 55, 75) extending in the longitudinal direction, the outer tracks and inner tracks forming sets of tracks, with a torque transmitting ball (38, 56, 78) being guided in each set of tracks, the outer tracks and inner tracks each comprising curved center lines, with the center lines of the individual sets of tracks intersecting one another in a central joint plane ($E_2$, $E_3$, $E_4$) positioned normally relative to the longitudinal axes when the longitudinal axes are aligned; and,
   a ball cage (36, 56, 76) accommodating the balls (38, 58, 78) in circumferentially distributed cage windows (37,

57, 77) and, when the joint is articulated, guiding the balls on to an angle-bisecting plane between the longitudinal axes, wherein the cage windows (37, 57, 77) each accommodate only pairs (38$_1$, 38$_2$) of balls and, when the joint (31, 51, 71) is aligned, in the central joint plane ($E_2$, $E_3$, $E_4$, a first angular distance ($\alpha 1$) of the balls within the individual pairs (38$_1$, 38$_2$) of balls is smaller than a second angular distance ($\alpha 2$) between balls associated with pairs adjoining one another and the ratio of the first and second angular distances ($\alpha 1$), ($\alpha 2$) ranges between 1.2 and 1.8, and wherein the center lines of the sets of tracks of the pairs (38$_1$, 38$_2$) of balls extend in planes which extend parallel relative to one another, and wherein the joint is provided with four pairs of balls.

2. A joint according to claim 1, wherein the center lines of the outer tracks (33) and of the inner tracks (35) change their distance from the longitudinal axis of the respective component in their longitudinal extension correspondingly.

3. A joint according to claim 2, wherein the center lines of the two outer tracks (33, 73) of each pair of tracks extend symmetrically relative to one another and wherein the center lines of the two inner tracks (35, 75) of each pair of tracks extend symmetrically relative to one another.

4. A joint according to claim 1, wherein the center lines of the outer tracks (53, 73) and of the inner tracks (55, 75) of the sets of tracks of the pairs of balls change their distance from the longitudinal axis of the respective component in their longitudinal extension in opposite sense.

5. A joint according to claim 1, wherein the cage windows (37') comprise circumferentially extending ball contact guiding flanks (39', 40') which extend parallel relative to one another and wherein the cage windows comprise ball contact guiding flanks connecting ball contact end flanks (41', 42') which extend substantially radially relative to the longitudinal axis of the ball cage (36').

6. A joint according to claim 4, wherein the center line of the outer track (53$_1$) of one set of tracks of a pair of tracks extends symmetrically relative to the center line (55$_2$) of the inner track of the other set of tracks of the pair of tracks and wherein the center line of the inner track (55$_1$) of one set of tracks of this pair of tracks extends symmetrically relative to the center line (53$_2$) of the outer track of the other set of tracks of the pair of tracks.

* * * * *

UNITED STATES PATENT AND TRADEMARK OFFICE
CERTIFICATE OF CORRECTION

| | | |
|---|---|---|
| PATENT NO. | : 7,025,683 B2 | |
| APPLICATION NO. | : 10/332292 | |
| DATED | : April 11, 2006 | |
| INVENTOR(S) | : Peter Schwarzler | |

It is certified that error appears in the above-identified patent and that said Letters Patent is hereby corrected as shown below:

Column 6,
Line 59, should read as follows: -- (38, 58, 78) being guided in each set of tracks, the outer --

Column 7,
Line 7, should read as follows: -- $E_4$), a first angular distance ($\alpha1$) of the balls within the --

Signed and Sealed this

Eleventh Day of July, 2006

JON W. DUDAS
*Director of the United States Patent and Trademark Office*